United States Patent [19]
Powell et al.

[11] Patent Number: 5,721,997
[45] Date of Patent: Feb. 24, 1998

[54] CAMERA HANDLE

[76] Inventors: Randy J. Powell; Susan M. Powell, both of 874 S. Rancho Vista Hills, Prescott, Ariz. 86303

[21] Appl. No.: 574,336

[22] Filed: Dec. 18, 1995

[51] Int. Cl.$^6$ ................................... G03B 29/00
[52] U.S. Cl. .......................... 396/420; 396/428
[58] Field of Search ..................... 354/82; 396/419, 396/420, 421, 422, 424, 428

[56] References Cited

U.S. PATENT DOCUMENTS

| | | | |
|---|---|---|---|
| 2,660,103 | 11/1953 | Culp | 354/82 |
| 2,806,416 | 9/1957 | Jones, Jr. | 354/82 |
| 3,520,241 | 7/1970 | Caldwell | 354/82 |
| 4,177,967 | 12/1979 | Marchus | 354/82 |
| 4,526,308 | 7/1985 | Dovey | 354/82 |
| 5,243,370 | 9/1993 | Slater | 354/82 |

*Primary Examiner*—David M. Gray
*Attorney, Agent, or Firm*—Cahill, Sutton & Thomas P.L.C.

[57] ABSTRACT

A multipurpose camera handle includes a base member attachable to the camera. Connected to the base member for rotation about its axis is a first arm which extends transversely of the camera lens axis. A second arm is connected to the first arm at a right angle thereto. The second arm has two telescoping and relatively rotatable sections. A hand grip is connected to the distal end of one of the sections of the second arm. The arrangement permits the hand grip to be positioned at various locations behind, above and beneath the camera.

7 Claims, 2 Drawing Sheets

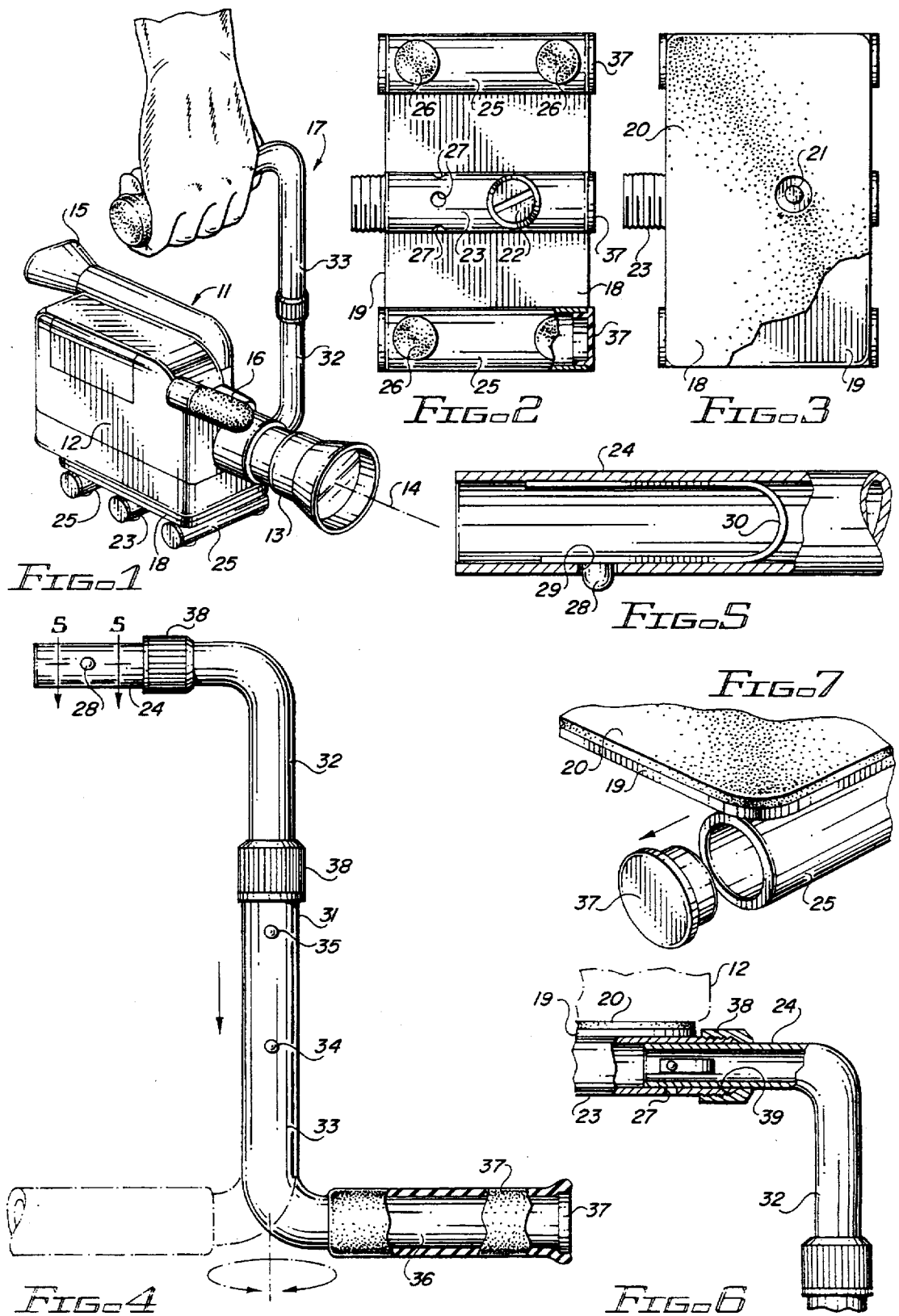

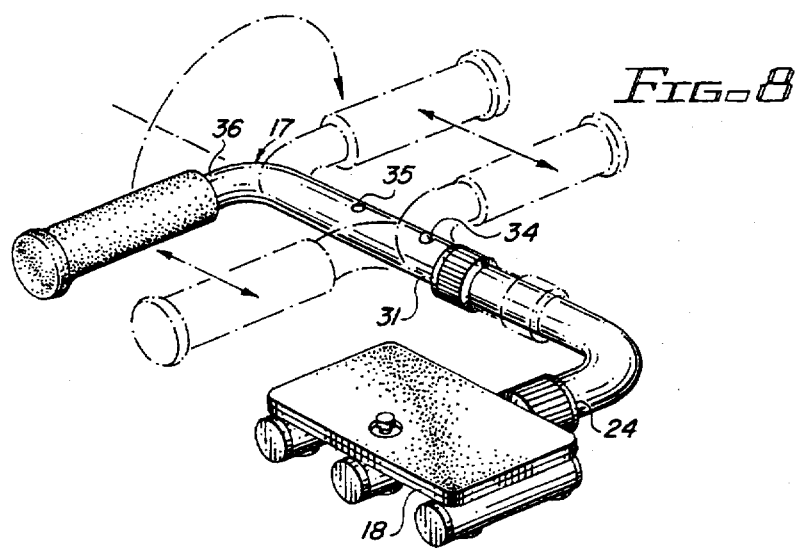
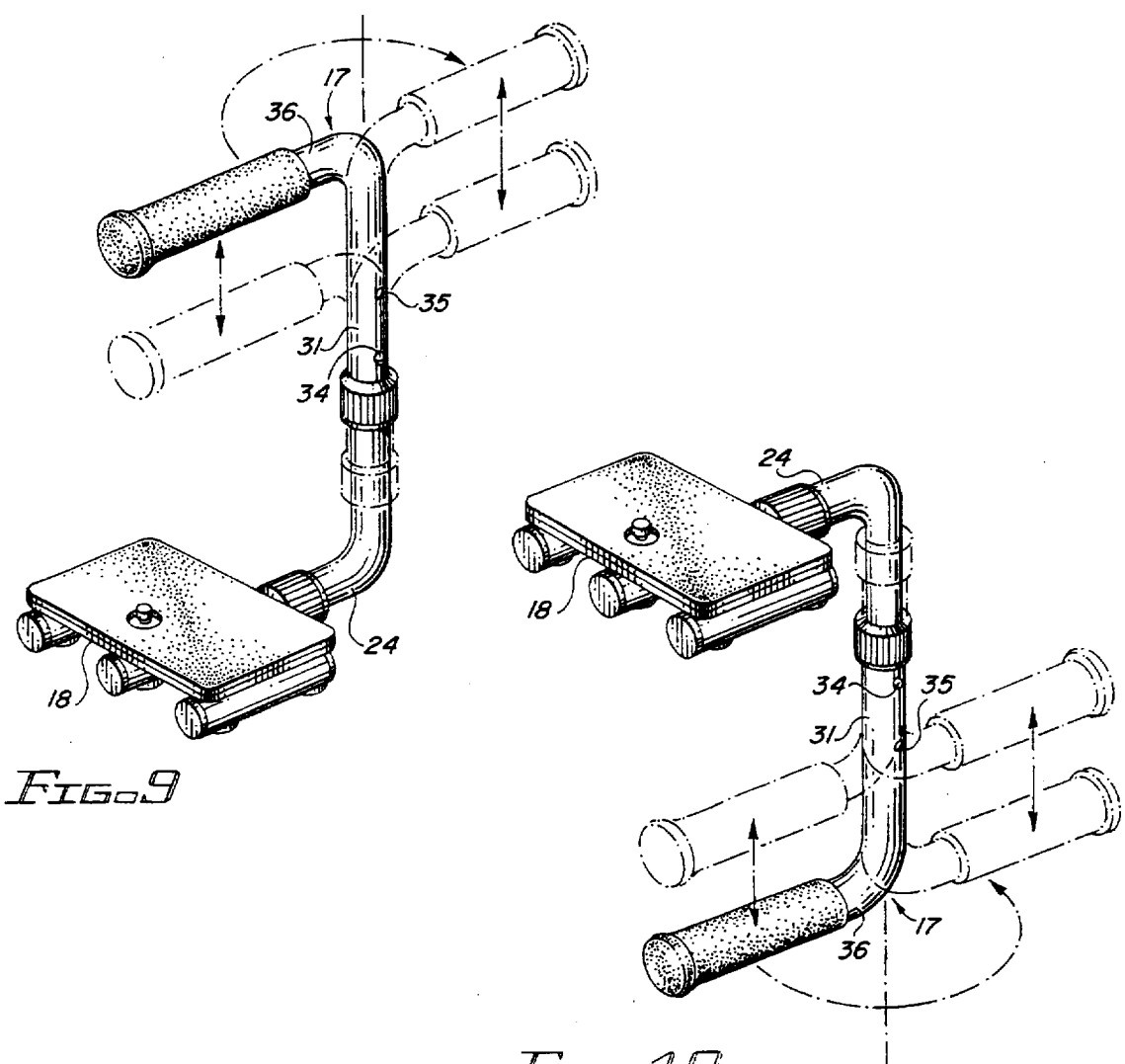

1

CAMERA HANDLE

TECHNICAL FIELD

This invention is concerned with carrying and steadying a camera, particularly a video recording camera.

BACKGROUND ART

Video recording cameras, or "camcorders" as they are commonly called, tend to be somewhat bulkier than hand held still cameras and, therefore, should be equipped with a reliable carrying handle. And because they are kept in operation over extended periods of time the camcorders are desirably provided with means for steadying the camera during use.

Prior inventors have devised movable handles for use with cameras. For example, L. M. Culp in his U.S. Pat. No. 2,660,103 granted Nov. 24, 1953 for "Combination Metering and View Finding Camera with Swivel Handle Grip" discloses a handle attachment which permits the camera to be swung between vertical and lateral picture taking positions. U.S. Pat. No. 3,520,241 granted Jul. 14, 1970 to D. R. Caldwell for "Pistol Grip Movie Camera" discloses a pivoted handle movable between a carrying position and a pistol grip position for shooting motion pictures.

Neither of these prior patents teaches or suggests converting a carrying handle into means for stabilizing the camera during use.

DISCLOSURE OF THE INVENTION

This invention contemplates a multi-position camera handle comprising three connected arms. The first arm is positioned for rotation about its axis which extends transversely of the camera lens axis. This arm is rotately mounted on a base member attachable to the camera. A second handle arm is connected at a right angle to the end of the first arm. This second arm is made from two telescoping sections with the first section attached to the first arm. The other, or second, section is rotatable and slidable with respect to the first section. A third arm, or handle grip, is connected to the second section of the second arm at a right angle thereto.

The arrangement is such that the handle can be placed in different positions to perform different functions.

BRIEF DESCRIPTION OF THE DRAWINGS

The invention is described in greater detail hereinafter by reference to the accompanying drawings wherein:

FIG. 1 is a perspective view of a camcorder with the handle of this invention attached thereto;

FIG. 2 is a bottom view of a base member forming a part of the handle;

FIG. 3 is a top view of the base member shown in FIG. 2;

FIG. 4 is an elevational view of the moveable arms of the handle with the handle in a lowered position for propping up the camcorder;

FIG. 5 is an enlarged sectional view through one of the arms of the handle taken as indicated by line 5—5 in FIG. 4.

FIG. 6. is a partial sectional view through the connection between the base member and a first arm of the handle;

FIG. 7 is an enlarged fragmentary view of a foot on the base member;

FIG. 8 is a perspective view showing the handle positioned for storage or for use as a shoulder or chest rest;

FIG. 9 is a perspective view showing the handle positioned for carrying the camcorder or for positioning the camcorder for a low level shot; and FIG. 10 is a perspective view showing the handle positioned for propping the camcorder on a solid surface.

BEST MODE FOR CARRYING OUT THE INVENTION

Referring first to FIG. 1, there is shown an audio/visual camera recorder, or camcorder, identified generally by reference numeral 11. Camcorder 11 is of conventional construction comprising a body 12 containing a tape cassette (not shown), a lens assembly 13 having a lens axis indicated at 14, an eye piece 15 by which the picture to be taken is framed, and a microphone 16.

The multi-position handle of this invention is identified generally in FIG. 1 by the reference numeral 17. Handle 17 is attached to the camcorder 11 by means of a base member 18 which preferably comprises an aluminum plate 19 with a thin sheet rubber covering 20 on its upper surface. Base member 18 is detachably attached to the body 12 of camcorder 11 by a stud bolt 21 having a knurled plastic knob 22 secured to its lower end. Bolt 21 screws into a threaded opening (not shown) which is routinely provided in camcorders usually to enable a tripod to be attached to the camcorder.

Secured to the bottom surface of the base member plate 19 is a transverse tube 23 adapted to receive for rotary motion therein a first tubular arm 24 of the handle 17. Tube 23 and first tubular arm 24 therein extend at substantially a right angle to lens axis 14 in a position substantially near the fore and aft center of gravity of the camcorder 11.

To enable the camcorder to rest in a stable position on a flat surface when not in use it is desirable to provide fore and aft feet 25 on the bottom surface of base member plate 19. For simplicity of manufacture the feet 25 may be short sections of the same tubing used to form transverse tube 23. Each foot 25 may have small rubber or felt pads 26 attached to their lower surfaces to protect the surface on which the camcorder rests.

That portion of the first tubular arm 24 which extends into transverse tube 23 carries therein a spring loaded detent which cooperates with a series of three holes 27 positioned at 90° intervals around tube 23. The detent mechanism, which is shown enlarged in FIG. 5, includes a cylindrical button 28 positioned in an opening 29 in arm 24 and mounted on a U-shaped leaf spring 30 inside arm 24.

By depressing button 28 into and clear of an opening 27 in transverse tube 23 arm 24 can be rotated to one of the other two positions in which the button enters another opening 27 in tube 23. The detent mechanism with button 28 thus constitutes a means for releasably locking first arm 24 in each of three rotational positions with respect to the base member 18.

The handle 17 also includes a second arm 31 which is connected to and positioned at substantially a right angle to the first arm 24. The second arm 31 is comprised of first and second telescoping and relatively rotatable sections designated 32 and 33 respectively. The first section 32 of arm 31 is connected to the first arm 24 and preferably is integral therewith being formed from the same length of tubing. The second section 33 of arm 31 is formed of tubing having an inside diameter slightly larger than the outside diameter of the first section 32. This connection between the two arm sections 32 and 33 permits the second section 33 to both slide on and rotate on the first section 32.

Second arm 31 further includes means for releasably locking its second section 33 in each of a plurality of telescopic and rotational positions relative its first section 32. This means is a detent mechanism like that described above and comprising a spring biased button 34 carried by the first section 32 and which cooperates with a plurality of openings 35 on opposite sides of and spaced along the second section 33. The arrangement is such that second section 33 can be rotated between two positions 180° apart and telescoped between two telescopic positions in relation to the first section.

Finally, arm 31 further includes a hand grip 32 connected to the distal end of the second section 33 at substantially a right angle thereto. Hand grip 36 preferably is integral with the second section 33 and may be formed from the same length of tubing. And hand grip 36 is preferably covered with a sleeve 37 of soft foamed rubber or plastic for comfort and safety in handling the camcorder.

If desired, the open ends of the hand grip 36, the feet 25 and transverse tube 23 may be closed with plugs 37. If the plugs 37 are removable (See FIG. 7) the interiors of the tubular members can be used for storage of small items, such as a rain cover for the camcorder.

The detent mechanism for releasably locking the first arm 24 in place in transverse tube 23 and for locking the two sections 32 and 33 of the second arm 31 together are inherently loose fittings. The locking mechanisms permit limited movement of the connections which can be characterized as a "rattle". There are two undesirable consequences of the rattle. First, the camcorder 11 may wiggle from outside forces, such as wind, even though the handle 17 is firmly stabilized. The camera wiggle produces a jumpy and undesirable video image. Secondly, the rattle is audible and can be picked up by the microphone 16 thus spoiling the sound track of the audio-visual recording.

To eliminate the rattle each of the connections susceptible to the rattle is provided with a threaded snubbing collar 38. As best shown in FIG. 6, each collar 38 is provided with an internal taper 39 engageable with the outer tube of the connection. When the collar 38 is tightened on the outer tube of its connection the tapered portion forces the end of the outer tube into tight frictional engagement with the inner tube, thus, snubbing the connection to eliminate rattling.

In the interest of saving weight the three arms 24, 31 and 36 of handle 17 are all preferably fabricated from aluminum tubing.

The versatility of the multi-position handle 17 is illustrated in FIGS. 8, 9 & 10.

FIG. 8 illustrates a multi-function position for the handle 17. The second arm 31 of the handle is disposed horizontally with the hand grip 36 positioned behind the camcorder. With the two sections of handle arm 31 telescoped together the hand grip 36 is positioned closely adjacent the rear of the camcorder body 12 for storage of the camcorder. When the sections of arm 31 are extended the hand grip 36 can be placed either against the shoulder (solid line position) to steady the camcorder or the hand grip can be flipped over 180° (dot and dash line position) to rest against the chest region of the camera person.

FIG. 9 illustrates the handle position for carrying the camcorder or for holding the camcorder for low level shooting. In this position the hand grip 36 is positioned above the fore and aft center of gravity of the camcorder.

In FIG. 10 the handle position shown with arm 31 projecting downwardly from the camcorder is used to steady the camcorder by resting it on a solid object such as the hood or fender of an automobile.

From the foregoing it should be apparent that this invention provides a versatile, multi-purpose camera handle.

What is claimed is:

1. A multi-position camera handle for steadying a camera in a position in which the lens axis of the camera is oriented in a substantially horizontal direction, said handle comprising a base member attachable to the camera, a first arm mounted on said base member for rotation about a horizontal axis which extends transversely of the lens axis of the camera, a second arm connected to said first arm at substantially a right angle thereto, said second arm comprising first and second telescoping sections which are also capable of relative rotational movement, a hand grip connected to the second telescoping section of the second arm, said hand grip being disposed at substantially a right angle to said second arm, and means for releasably retaining said first arm in each of a plurality of positions of rotation whereby said hand grip may be releasably positioned above the camera, beneath the camera and behind the camera, all with the camera lens axis oriented in a substantially horizontal direction.

2. The camera handle of claim 1 further comprising means for releasably retaining the first and second sections of said second arm in each of a plurality of positions of relative rotation.

3. The camera handle of claim 1 further comprising means for releasably retaining the first and second sections of said second arm in each of a plurality of telescopic positions.

4. The camera handle of claim 1 further comprising means for releasably retaining the first and second sections of said second arm in each of a plurality of positions of relative rotation and each of a plurality of telescopic positions.

5. The camera handle of claim 1 further comprising means for snubbling the connection between said first arm and said base member to prevent rattling in the connection.

6. The camera handle of claim 2 further comprising means for snubbing together the first and second sections of said second arm to prevent rattling between the sections.

7. The camera handle of claim 4 further comprising means for snubbing together the first and second sections of said second arm to prevent rattling between the sections.

* * * * *